United States Patent Office 3,121,731
Patented Feb. 18, 1964

3,121,731
PROCESS FOR MAKING MONO (AMINOALKYL) PHOSPHITE ESTERS
Georges Quesnel, Suresnes, Jacques Georges Charles Girard, Bezens, and Andre Thiot, Houilles, France, and Harold Coates, Wombourn, and David Albert Brown, Longhope, England, assignors, by mesne assignments, to La Bakelite, a French company, and Omnium de Produits Chimiques pour l'Industrie et l'Agriculture "OPCIA," Paris, France, a French company
No Drawing. Filed Apr. 24, 1962, Ser. No. 189,700
Claims priority, application France Apr. 28, 1961
13 Claims. (Cl. 260—461)

This invention relates to novel phosphorus ester derivatives and to complexes thereof with aldehyde condensation products. The invention is also from some aspects an improvement in and in its other aspects is a modification of the invention described and claimed in the specification of patent application No. 848,535, filed October 26, 1959.

In the specification of patent application No. 848,535 there is described the preparation of polyamidoethyl phosphite compounds by reacting monoethanolamine with phosphorous acid or a dialkyl or diaryl phosphite, and the production of flame-resistant materials by mixing such polyamidoethyl phosphites with a resin of the resol type compatible with the said phosphites. These polyamidoethyl phosphites, while giving satisfactory flame-resistant materials, are difficult to handle on the industrial scale owing to their highly viscous and sticky consistency.

We have now surprisingly found that the preparation of polyamidoethyl phosphites as described in specification No. 848,535 in fact leads to the production of a mixture of products containing, in addition to the polyamidoethyl phosphites, a monomeric compound of constant composition. We have also found that this monomeric compound can be separated from the polyamidoethyl phosphites by the use of a partitioning solvent. The monomeric compound is herein termed monoaminoethyl phosphite and is believed to have either the general formulae corresponding to the tautomeric forms:

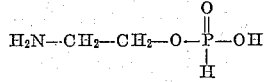

and

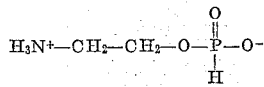

and/or the general formula

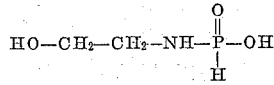

it is also possible that the phosphite grouping

may exist wholly or in part in its tautomeric tervalent form

We have also found that the reactions described in specification No. 858,535 are of more general application than had been supposed and that similar compounds to the polyamidoethyl phosphites may be prepared from monoalkanolamines containing 3 or 4 carbon atoms. Moreover, we have found that monoaminoalkyl phosphites of similar structure to the monoaminoethyl phosphite are formed at the same time as the polyamidoalkyl phosphites and may also be separated from these compounds by the use of a partitioning solvent.

The monoaminoalkyl phosphites are novel compounds and (unlike the polyamidoalkyl phosphites) are colorless crystalline compounds. They are therefore much easier to handle and can be incorporated more readily into aldehyde condensation products to which they impart flame-resistant properties. In view of their crystallinity they also find use in applications where the polyamidoalkyl phosphites may not readily be employed because of their sticky liquid nature.

Further, we have discovered that the proportion of polyamidoalkyl phosphites produced at the same time as a monoaminoalkyl phosphate may be minimized if the total proportion of the phosphorus compounds in the reaction with the monoalkanolamine is closely controlled with the result in these instances that the separation of the crystalline monoaminoalkyl phosphite can often be reduced to a simple recrystallization step from an alcohol or an aqueous solution thereof.

Accordingly, in one aspect the present invention consists in a monoaminoalkyl phosphite of the general formula

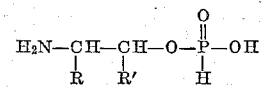

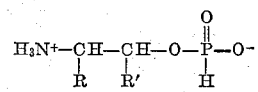

and/or

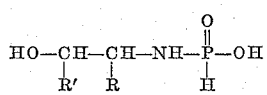

wherein R and R' each represent a hydrogen atom or a methyl group. The preferred compound of the invention is monoaminoethyl phosphite of the above general formula wherein R and R' each represent a hydrogen atom.

In a further aspect the present invention consists in a process for the preparation of a monoaminoalkyl phosphite which comprises (1) heating a monoalkanolamine of the formula HO—CHR'—CHR—NH$_2$, wherein R and R' each represent a hydrogen atom or a methyl group, a phosphorus compound being phosphorous acid, a phosphite ester or a salt of either of these formed from a volatile base or with a mixture of such phosphorus compounds, the reaction being carried out under such conditions that by-products liberated during the reaction are removed from the reaction phase; and (2) separating the formed monoaminoalkyl phosphite as a crystalline solid from any polyamidoalkyl phosphite produced therewith by the use of a partitioning solvent. The preferred partitioning solvents are methanol, ethanol, isopropanol and aqueous solutions thereof.

In yet a further aspect the invention consists in a process as stated above, in which the amount of polyamidoalkyl phosphites produced is minimized by reacting the monoalkanolamine with the phosphorus compound or compounds in substantially equimolecular proportions calculated on the total phosphorus content of the said compounds, the reaction being carried out in the presence of at least sufficient water and/or phosphorous acid to convert any secondary and tertiary phosphite esters to the corresponding primary phosphite esters.

The invention also consists in the preparation of organo-phosphorus resinous complexes by mixing the aforesaid monoaminoalkyl phosphites with partially condensed resin-forming aldehyde condensation products.

The process of the invention can be carried out by reacting a monoalkanolamine of the type described with phosphorous acid by an esterification or dehydration reaction according to the equation:

$$H_2N-CHR-CHR'-OH + H_3PO_3 \longrightarrow$$

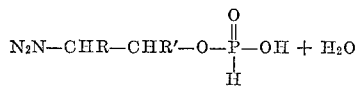
$$H_2N-CHR-CHR'-O-\underset{H}{\overset{O}{\underset{\|}{P}}}-OH + H_2O$$

Alternatively, the process can be carried out by reacting the monoalkanolamine with a primary phosphite ester in an alcoholysis reaction. By primary phosphite ester we mean a compound of the formula $ZOPO_2H_2$ where Z is a substituted or unsubstituted alkyl or aryl group; such a compound is often referred to as a monoalkyl or monoaryl phosphite. The production of the monoaminoalkyl phosphite then takes place according to the equation:

$$H_2N-CHR-CHR'-OH + ZOPO_2H_2 \longrightarrow$$

$$H_2N-CHR-CHR'-O-\underset{H}{\overset{O}{\underset{\|}{P}}}-OH + ZOH$$

A secondary or tertiary phosphite ester may also be reacted with the monoalkanolamine, but the monoaminoalkyl phosphite is then only produced in significant yield if water and/or phosphorous acid is also present to convert the secondary and/or tertiary phosphate esters to the corresponding primary phosphite esters by hydrolysis or transesterification reactions, for example according to the equations:

$$(ZO)_2POH + H_2O \rightarrow ZOPO_2H_2 + ZOH$$
$$(ZO)_2POH + H_3PO_3 \rightarrow 2ZOPO_2H_2$$
$$(ZO)_3P + 2H_2O \rightarrow ZOPO_2H_2 + 2ZOH$$
$$(ZO)_3P + 2H_3PO_3 \rightarrow 3ZOPO_2H_2$$

In such a reaction any reasonable amount of water present in excess of that required for hydrolysis to the primary phosphite ester is not deleterious as only further hydrolysis of the primary phosphite ester to phosphorous acid occurs and the monoaminoalkyl phosphite is then produced by an esterification rather than by an alcoholysis reaction. By secondary and tertiary phosphites we mean compounds of the respective formulae $(ZO)_2POH$ and $(ZO)_3PO$ where Z has the same significance as before; such compounds are often referred to as dialkyl, diaryl, trialkyl or triaryl phosphites as the case may be.

The process of the invention can also be carried out by reacting the monoalkanolamine with a salt of phosphorous acid or a phosphite ester formed from a volatile base. Such a base is readily eliminated from the reaction phase during the production of the monoaminoalkyl phosphite and therefore even an initial excess of the base can be tolerated. The base is one volatile under the conditions of the reaction and is conveniently ammonia though monomethylamine and monoethylamine may also be employed, if desired.

However, in all these variations of the general process of the invention the monoaminoalkyl phosphite is produced in admixture with the polyamidoalkyl phosphite compounds and is only separated therefrom after treatment with the partitioning solvent. The amount of polyamidoalkyl phosphites can be minimized, though not entirely eliminated, by careful control of the proportions of reactants in order to favor production of the monoaminoalkyl phosphite. This control is achieved by reacting the monoalkanolamine with the phosphorus compound or compounds in substantially equimolecular proportions calculated on the total phosphorus content of the said compounds (including any phosphorous acid employed to convert secondary or tertiary phosphites to primary phosphites by a transesterfication reaction). Thus the controlled reaction is carried out with equimolecular proportions of the monoalkanolamine and phosphorous acid or a primary phosphite ester or a mixture thereof; and these compounds may, if desired, be formed in situ by hydrolysis or transesterification reactions carried out on secondary or tertiary phosphite esters. The phosphorous acid or primary phosphite ester can be in the form of salts formed from volatile bases as before described provided that the monoalkanolamine and the total phosphorus compounds are present in equimolecular proportions.

The present process with control of reactant proportions is described and claimed herein in terms of employing "substantially" equimolecular proportions of the reactants. This is to allow for some slight deviation from the exactly corresponding amounts of the reactants. Such deviation results only in a slight increase in the amount of polyamidoalkyl phosphites produced so that this amount can still be said to have been minimized. Moreover, it is usually desirable to employ some slight excess of the monoalkanolamine over the theoretical quantity as it is volatile to some extent under the conditions often employed for carrying out the reaction and there is therefore a tendency for some to be lost from the reaction phase before alcoholysis has taken place.

Various specific methods of carrying out the controlled process of the invention will now be mentioned.

Thus, equimolecular proportions of the monoalkanolamine and a primary phosphite ester may be reacted in the alcoholysis reaction and the alcohol or phenol liberated is a by-product which is removed from the reaction phase during the reaction. The primary phosphite ester may be formed in situ by the use of mixtures of:

(a) One molecular proportion of a secondary phosphite ester and at least one molecular proportion of water to provide the primary phosphite ester by a hydrolysis reaction according to the equation:

$$(ZO)_2POH + H_2O \rightarrow ZOPO_2H_2 + ZOH$$

(b) One molecular proportion of a tertiary phosphite ester and at least two molecular proportions of water to provide the primary phosphite ester by a hydrolysis reaction according to the equation:

$$(ZO)_3P + 2H_2O \rightarrow ZOPO_2H_2 + 2ZOH$$

(c) One-half of a molecular proportion of each of a secondary phosphite ester and phosphorous acid to provide one molecular proportion of the primary phosphite ester by a transesterification reaction according to the equation:

$$(ZO)_2POH + H_3PO_3 \rightarrow 2ZOPO_2H_2$$

or (d) one-third of a molecular proportion of a tertiary phosphite ester and two-thirds of a molecular proportion of phosphorous acid to provide one molecular proportion of the primary phosphite ester by a transesterification reaction according to the equation:

$$(ZO)_3P + 2H_3PO_3 \rightarrow 3ZOPO_2H_2$$

When the primary phosphite ester to be formed in situ, monoaminoalkyl phosphite is produced by the reactions of alcoholysis and either hydrolysis or transesterification. These reactions may be carried out concurrently or successively in either order, within the scope of the invention.

The process of the invention may also be carried out with control of the proportions of reactants employed, by reacting the monoalkanolamine in substantially equimolecular proportions with phosphorous acid to produce the monoaminoalkyl phosphite by an esterification reaction. This type of reaction is conveniently carried out by first forming a salt from equimolecular proportions of the monoalkanolamine and phosphorous acid and then dehydrating this salt under the influence of heat to produce the desired monoaminoalkyl phosphite.

The controlled process of the invention can also be carried out by reacting the monoalkanolamine with substantially an equimolecular proportion of a salt of phosphorous acid or a primary phosphite ester formed from a volatile base. Such salts can if necessary be formed in situ. Thus a monoaminoalkyl phosphite is conveniently prepared by first treating substantially equimolecular proportions of the monoalkanolamine with a salt of phosphorous acid derived from a volatile base followed by heating to form the monoaminoalkyl phosphite by dehydration. Diammonium phosphite is preferably used in this type of process forming the monoaminoalkyl phosphite according to the overall equation

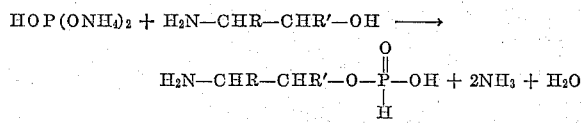

Alternatively, equimolecular proportions of phosphorous acid and the monoalkanolamine can be employed in the presence of an excess of ammonia.

In the method of the invention it is preferable to use those phosphites (primary, secondary or tertiary) which liberate an alcohol or a phenol as by-product which is volatile alone or in steam up to temperatures of about 180° C. at pressures down to 0.1 mm. of mercury. Suitable phosphites are, for example, mono-, di-, or trimethyl, ethyl, isopropyl, butyl, phenyl and tolyl phosphites.

The monoalkanolamine used in the preparation of the monoaminoalkyl phosphite is preferably monoethanolamine, but it may be monoisopropanolamine or 3-aminobutan-2-ol.

The processes of the invention are carried out under such conditions that the by-products liberated during the reaction are removed from the reaction phase. Such by-products may be water, alcohols, phenols and/or volatile bases depending on the nature of the reactants. The method of removal employed depends to some extent on the nature of the by-products. Thus water alone can be removed by entrainment, preferably with an inert organic solvent immiscible with water, for example chlorobenzene, dichlorbenzene or xylene. Alternatively, the reaction can be carried out at a temperature such that the by-products are distilled from the system, though in this instance the temperature will be maintained below the boiling point of the alkanolamine, taking care to avoid too much loss of the latter by co-distillation. This method of distillation is often conveniently operated under reduced pressure and, whatever method for the removal of by-products is employed, it is often convenient to subject the eventual reaction product to vacuum distillation to strip from it all volatile material. Vacuum steam distillation or azeotropic distillation with a higher boiling material can also be employed to remove the byproducts from the reaction phase.

The reaction between the monoalkanolamine and the phosphorus compound is carried out by heating. Preferably the reaction temperature is from 80 to 200° C. at atmospheric pressure or under vacuum; in any case care should usually be taken to avoid loss of volatile reactants in particular monoalkanolamine, from the reaction mixture before their reaction, particularly when the proportions of reactants employed are being closely controlled. Also when the proportions of reactants are being controlled the reaction mixture should not be subjected to more severe conditions of temperature than necessary since the use of high temperatures favours production of the polyamidoalkyl phosphites at the expense of the monoaminoalkyl phosphite.

By "volatile" whenever used in this specification we refer to a material which is gaseous under the conditions of temperature and pressure prevailing during the reaction between the monoalkanolamine and phosphorus compound.

In stage (2) of the process of the invention the formed monoaminoalkyl phosphite is separated from any polyamidoalkyl phosphite produced therewith and present in the reaction mixture by the use of a partitioning solvent, which may be, for example, an alcohol and/or water. The monoaminoalkyl phosphites are insoluble in alcohols at ambient temperatures while the polyamidoalkyl phosphites are soluble. Both the monoaminoalkyl phosphites and the polyamidoalkyl phosphites are soluble in water, but the former less so, and the monoaminoalkyl phosphites can be obtained in a crystalline state by the use of a limited amount of water as partitioning solvent. The preferred partitioning solvents are the lower water-soluble primary alcohols such as methanol, ethanol, isopropanol and aqueous solutions thereof. The most suitable is methanol or aqueous methanol, particularly when the monoaminoalkyl phosphite is prepared from phosphorous acid or its salts with volatile bases.

The preferred method of separation employed is to mix the reaction mixture with the partitioning solvent at refluxing temperatures and after agitation to allow dissolution of the polyamidoalkyl phosphites, the solution is cooled to 30° C. or below and then filtered or centrifuged to separate the crystalline monoaminoalkyl phosphite from the solution. The solution may then be stripped of the partitioning solvent to recover the polyamidoalkyl phosphites as a sticky viscous residue. The monoaminoalkyl phosphite is much more soluble in hot alcohols than in cold so that both the polyamidoalkyl phosphites and the monoaminoalkyl phosphite may dissolve initially when mixed with a hot alcohol, but the monoaminoalkyl phosphite then separates out on cooling the solution. Alternatively the separation may be carried out by stirring the mixture of reaction products with the partitioning solvent at room temperature or below to extract therefrom the polyamidoalkyl phosphites and/or bring about crystallization of the monoaminoalkyl phosphite. The monoaminoalkyl phosphites may be further purified by recrystallization from an alcohol, preferably by the use of an aqueous alcohol as recrystallizing solvent, for example a mixture of methanol and water in a volume ratio of about 4:1. In cases where the molecular proportions of reactants are closely controlled to minimize the formation of the polyamidoalkyl phosphites, the separation with the partitioning solvent may be reduced to a simple recrystallization of the reaction product from methanol, ethanol, isopropanol or aqueous solutions thereof as the partitioning solvent. When water is used as the partitioning solvent it is often necessary to refrigerate the reaction product for some time in the presence of a limited amount of water, as described hereafter in Example 6, before crystallization of the monoaminoalkyl phosphite occurs.

As stated previously the monoaminoalkyl phosphites are crystalline solids and are convenient to handle. They are colourless. The preferred compound of the invention is monoaminoethyl phosphite having a melting point of 200–208° C., after sintering at 150–160° C.

In yet another aspect, the invention consists in the preparation of flame resistant organo-phosphorus resinous complexes by mixing the aforesaid monoaminoalkyl phosphites with partially condensed resin-forming aldehyde condensation products, for example, phenol-aldehyde polymers of the resol type, urea-formaldehyde or melamine-formaldehyde.

In the case of the said resol polymers the partially condensed condensation product may be prepared by condensing one molecular proportion of a phenol with at least one molecular proportion of an aldehyde. When the condensation is complete, urea, ammonia or an aminated base which is capable of reacting with aldehyde, may, if desired, be added to eliminate the excess of aldehyde. The reaction may be catalyzed by a base, for example barium or sodium hydroxide. The polymers are compatible with the monoaminoalkyl phosphites and are sufficiently unreactive to water, after the formation of the complex, to protect the phosphites by blocking them in the three dimensional lattice.

The proportions of phosphite to phenol-aldehyde or other condensation products may advantageously be of the order of 5 to 30% and the preferred condensation product is formed from phenol and formaldehyde.

The complex is prepared by mixing the phosphite and the phenolaldehyde or other condensation product if desired in a solvent such as, for example, water or alcohol. If a solvent is used, the pH of the solution is preferably between 5 and 8.

To be certain of keeping the complex stable it is advisable to store the solutions at a low temperature, for example between 1° C. and 10° C. However, we have found that some solutions of the complex may be stored for several weeks at room temperature.

The complexes may be used as bonding agents for organic cellulosic or mineral fillers and may be molded or used for coatings or laminations, or as adhesives in the manner known for resinous products, thereby obtaining products having flame-resistant characteristics.

The monoaminoalkyl phosphites of the invention also find use as additives for polyurethane resins and foams where they impart a measure of flame-resistance to the polymer, and as antioxidants for thermoplastic polymers. The monoaminoalkyl phosphites may also be oxidized to the corresponding monoaminoalkyl phosphates.

The invention is illustrated by the following examples, the parts being by weight:

*Example 1*

Dimethyl phosphite (550 parts, 5.0 mol.) was warmed to 80° C. and a mixture of water (90 parts, 5.0 mol.) and monoethanolamine (317 parts, 5.2 mol.) was added dropwise with stirring. The temperature rose gradually to 110°–120° C. and the methanol liberated was allowed to reflux gently. After the addition of the ethanolamine-water mixture was complete the solution was heated gradually to 160° C. with the methanol being distilled off. After heating for 1 hour at 160° C. the mixture was allowed to cool to approximately 100° C. and vacuum applied (pressure 15 mm. Hg. absolute). The mixture was then again heated to 160° C. under this vacuum. After cooling to approximately 100° C. the product was poured into methylated spirits (800 parts), cooled and filtered. Yield 362 parts (58 theory).

*Analysis:*

|  | C | H | N | P |
|---|---|---|---|---|
| Found | 19.5 | 6.98 | 10.8 | 24.4 |
| Calc. for $C_2H_8O_3NP$ | 19.2 | 6.4 | 11.2 | 24.8 |

*Example 2*

The process of Example 1 was carried out using diethylphosphite (690 parts, 5.0 mol.), water (90 parts, 5.0 mol.) and monoethanolamine (317 parts, 5.2 mol.). 490 parts of a white crystalline product were obtained (78.5% yield).

*Example 3*

Phosphorous acid (410 parts, 5.0 mol.) was added to diethyl phosphite (690 parts, 5.0 mol.) and the mixture stirred at 80° C. for one hour. The mixture was cooled to room temperature and monoethanolamine (624 parts, 10.2 mol.) was added gradually with stirring, allowing the mixture to warm up. After the ethanolamine addition was complete the mixture was heated slowly with stirring to 160° C., ethanol being distilled off. When the ethanol distillation slackened off vacuum was applied as in Example 1 and the mixture maintained at 180° C. for a further 1 hour. The syrupy product was allowed to cool to approximately 100° C. and precipitated by pouring into hot methylated spirits, cooling and filtering off the white, crystalline product. Yield 1013 parts (81% theory).

*Example 4*

A mixture of monoethanolamine (317 parts, 5.2 mol.) and water (90 parts, 5.0 mol.) warmed to 80° C. was treated with stirring with diisopropyl phosphite (650 parts, 3.9 mol.), added dropwise and allowing the mixture to warm up under reflux. When the addition of phosphite was complete the mixture was warmed gradually to 180° C. whilst distilling off the isopropanol. The removal of isopropanol was completed by heating at 180° C. for 1 hour at 15 mm. pressure. The residue was worked up by pouring into hot isopropanol, cooling and filtering. Yield 545 parts of aminoethyl phosphite (87% theory).

*Example 5*

Dibutyl phosphite (970 parts, 5.0 mol.) was warmed to 120° C. and treated with stirring with a mixture of ethanolamine (317 parts, 5.2 mol.) and water (90 parts, 5.0 mol.). After the addition of aqueous ethanolamine was complete the mixture was heated at 130° C. for 3 hours, butanol being distilled off. The reaction was completed by heating for a further 2 hours at 180° C. under vacuum (15 mm. Hg). The syrupy product was allowed to cool to 120° C. and poured into hot isopropanol with stirring. Cooling and filtration gave aminoethyl phosphite (405 parts) (65% theory).

*Example 6*

A mixture of isopropanolamine (390 parts, 5.3 mol.) and water (90 parts, 5.0 mol.) was added gradually to diisopropyl phosphite (650 parts, 3.9 mol.), with stirring at 110° C. The temperature rose steadily to 125° C. and the isopropanol refluxed. At the end of the addition the mixture was heated gradually to 180° C. while distilling off the isopropanol. After 2 hours at 180° C. vacuum (15 mm. Hg) was applied and the heating and stirring continued for a further one hour. The mixture was cooled, diluted with water (400 parts) and refrigerated to 0° F. Filtration gave crystalline aminopropyl phosphite (414 parts). (66% theory) having a melting point of 200–205° C. after sintering 150–160° C.

*Analysis:*

|  | C | H | N | P |
|---|---|---|---|---|
| Found | 25.7 | 6.99 | 9.5 | 22.0 |
| Calc. for $C_3H_{10}O_3NP$ | 25.9 | 7.2 | 10.1 | 22.3 |

*Example 7*

Triphenyl phosphite (930 parts, 3.0 mol.) was heated to 100° C. and a mixture of monoethanolamine (190 parts, 3.1 mol.) and water (110 parts, 6.2 mol.) was added dropwise during 60 mins. at 100–110° C. After the addition of all of the water and ethanolamine the mixture was heated at 100–110° C. for 30 mins. Phenol was removed by distillation at 12 mm. up to an internal temperature of 150° C. 715 parts of phenol (85%) were recovered. The residue from the distillation was stirred into hot methylated spirits. The mixture was cooled and the solid removed by filtration. Yield 340 parts (80% theory).

*Analysis:*

|  | C | H | N | P |
|---|---|---|---|---|
| Found (percent) | 19.9 | 6.62 | 10.9 | 24.8 |
| Calc. for $C_2H_8O_3NP$ | 19.2 | 6.4 | 11.2 | 24.8 |

*Example 8*

To 640 parts of a 50% aqueous solution of phosphorous acid (4 mol.) and 305 parts (5.0 mol.) of ethanolamine, aqueous ammonia (specific gravity 0.88) was added until a pH of 7 was obtained. Water was distilled off at a reduced pressure. The mixture was then heated to 180° C. for 4 hours at 10 mm. pressure.

The product crystallized spontaneously in an 80:20 mixture of methanol and water.

Example 9

To 495 parts (4.2 mol.) of diammonium phosphite were added 305 parts (5.0 mol.) of ethanolamine while stirring. The mixture was then distilled and heated as in Example 8.

The product crystallized spontaneously in an 80:20 mixture of methanol and water.

Example 10

Ethanolamine 366 g. (6 mol.) was added to a solution of 510 gms. phosphorous acid (6.2 mol.) in 200 ml. of water. The solution was concentrated in vacuo (15 mm.) up to an internal temperature of 200° C. The syrup was heated at 200–220° C. for 1 hour. The syrup, which contained a mixture of aminoethyl phosphite and polyamidoethyl phosphites, was allowed to cool to approximately 120° C. and then poured into 1 liter of methanol. When cool the precipitated aminoethyl phosphite was filtered off, washed with a little methanol and dried. Yield 480 gms. (64% theory).

Example 11

100 parts of phenol, 130 parts of a 37% aqueous solution of formaldehyde and 1 part of sodium carbonate were place in a reaction vessel and heated for 30 minutes at 60° C. The temperature was then raised to 80° C. during 10 minutes and heating was continued at this temperature for 50 minutes. The resulting mixture was distilled under maximum vacuum until its $n_D$ reached a value of 1.500 (yield 200–202%). A solution of 26 parts of monoaminoethyl phosphite, obtained as described in any of the preceding examples, in an equal quantity of distilled water was added, and a resinous complex in the form of a deep brown liquid was formed in a yield of 252–255% and having the following characteristics:

| | |
|---|---|
| Refractive index, $n_D$ | 1.484. |
| Content of dried solids | 55–56%. |
| Viscosity at 25° C | 20–25 cps. |
| Miscibility in $H_2O$ | Greater than 20 parts $H_2O$ to one of resin. |
| Free formaldehyde | 4–5%. |
| Free phenol | 11–13%. |

The yields referred to in this example are percentages by weight of the phenol used.

What we claim is:

1. A process for the preparation of a mono(aminoalkyl) phosphite which consists essentially of the steps of:
   (1) reacting at a temperature of at least 80° C. a mixture comprising a monoalkanolamine of the formula HO—CHR'—CHR—NH$_2$, wherein R and R' are each selected from the group consisting of a hydrogen atom and methyl, and at least one phosphorus compound selected from the group consisting of phosphorous acid, lower alkyl phosphite, lower alkyl phenyl phosphite, phenyl phosphite, phosphorous acid salt, lower alkyl phosphite salt, lower alkyl phenyl phosphite salt, and phenyl phosphite salt, said salts being formed from a volatile base;
   (2) concurrently removing from the reaction phase by-products liberated during the said reaction;
   (3) thereafter treating the reaction product with at least one partitioning solvent selected from the group consisting of water-soluble primary alcohols having 1 to 3 carbon atoms and water; and
   (4) separating the formed mono(aminoalkyl) phosphite as a crystalline solid from said partitioning solvent and any polyamidoalkyl phosphite produced therewith.

2. A process as claimed in claim 1 wherein step (2) consists essentially of distilling the said by-products from the reaction phase during the reaction of step (1), the said distillation being carried out at least during part of the said step (2) under sub-atmospheric pressure.

3. A process for the production of a mono(aminoalkyl) phosphite which consists essentially of the steps of:
   (1) reacting at a temperature of at least 80° C. a mixture consisting essentially of (a) a monoalkanolamine of the formula HO—CHR'—CHR—NH$_2$, wherein R and R' are each selected from the group consisting of a hydrogen atom and methyl, (b) a substantially equimolecular proportion of at least one phosphorous compound selected from the group consisting of phosphorous acid, lower alkyl phosphite, lower alkyl phenyl phosphite, phenyl phosphite, phosphorous acid salt, lower alkyl phosphite salt, lower alkyl phenyl phosphite salt, and phenyl phosphite salt, said salts being formed from a volatile base and the said proportion being based on the total weight of the said phosphorous compounds present, and (c) at least sufficient of a reagent selected from the group consisting of water and phosphorous acid to convert any secondary and tertiary phosphite esters to the corresponding phosphite esters;
   (2) concurrently removing from the reaction phase by-products liberated during the said reaction;
   (3) thereafter treating the reaction produce with at least one partitioning solvent selected from the group consisting of water-soluble primary alcohols having 1 to 3 carbon atoms and water; and
   (4) separating the formed mono(aminoalkyl) phosphite as a crystalline solid from said partitioning solid and any polyamidoalkyl phosphite produced therewith.

4. A process as claimed in claim 3, wherein step (2) consists essentially of distilling the said by-products from the reaction phase during the reaction of step (1), the said distillation being carried out at least during part of the said step (2) under sub-atmospheric pressure.

5. A process as claimed in claim 4, wherein the said treatment and separation of steps (3) and (4) comprise recrystallising the reaction product from the partitioning solvent which is selected from the group consisting of water-soluble primary alcohols having 1 to 3 carbon atoms and aqueous solutions thereof.

6. A process for the production of a mono(aminoalkyl) phosphite which consists essentially of the steps of:
   (1) reacting at a temperature of at least 80° C. substantially equimolecular proportions of monoethanolamine and an equivalent of a primary phosphite ester selected from the group consisting of lower alkyl phosphite, lower alkyl phenyl phosphite, and phenyl phosphite, formed from appropriate quantities of non-primary phosphite esters and phosphorous acid by transesterification;
   (2) concurrently removing from the reaction phase by-products liberated during the said reaction;
   (3) thereafter treating the reaction product with at least one partitioning solvent selected from the group consisting of water-soluble primary alcohols having 1 to 3 carbon atoms and water; and
   (4) separating the formed mono(aminoalkyl) phosphite as a crystalline solid from said partitioning solvent and any polyamidoalkyl phosphite produced therewith.

7. A process as claimed in claim 6, wherein step (2) consists essentially of distilling the said by-products and water from the reaction phase during the reaction of step (1), the said distillation being completed under sub-atmospheric pressure.

8. A process for the production of a mono(aminoalkyl) phosphite which consists essentially of the steps of:
   (1) preparing a mixture which comprises substantially equimolecular proportions of phosphorous acid and the monoethanolamine;

(2) heating the said mixture to a temperature of at least 80° C.;
(3) concentrating the said mixture by removal of by-products and any water initially present from the reaction phase, the concentration being completed under sub-atmospheric pressure;
(4) thereafter treating the reaction product with at least one partitioning solvent selected from the group consisting of water-soluble primary alcohols having 1 to 3 carbon atoms and water; and
(5) separating the formed mono(aminoalkyl) phosphite as a crystalline solid from said partitioning solvent and any polyamidoalkyl phosphite produced therewith.

9. A process for the production of a mono(aminoalkyl) phosphite which consists essentially of the steps of:
(1) reacting at a temperature of at least 80° C. a mixture which comprises substantially equimolecular proportions of an ammonium phosphite salt and monoethanolamine;
(2) concurrently removing from the reaction phase by-products liberated during the said reaction;
(3) thereafter treating the reaction product with at least one partitioning solvent selected from the group consisting of water-soluble primary alcohols having 1 to 3 carbon atoms and water; and
(4) separating the formed mono(aminoalkyl) phosphite as a crystalline solid from said partitioning solvent and any polyamidoalkyl phosphite produced therewith.

10. A process as claimed in claim 9, wherein the said mixture in step (1) also comprises an initial excess of ammonia and wherein step (2) consists essentially of distilling the said by-products from the reaction phase during the reaction of step (1), the said distillation being completed under sub-atmospheric pressure.

11. The process of claim 6 wherein monoisopropanolamine is substituted for monoethanolamine.

12. The process of claim 8 wherein monoisopropanolamine is substituted for monoethanolamine.

13. The process of claim 9 wherein monoisopropanolamine is substituted for monoethanolamine.

References Cited in the file of this patent

UNITED STATES PATENTS

| | | |
|---|---|---|
| 2,224,360 | Rozenbroek | Dec. 3, 1940 |
| 2,372,244 | Adams et al. | Mar. 27, 1945 |
| 2,816,876 | Higashi | Dec. 17, 1957 |
| 2,974,159 | Koral | Mar. 7, 1961 |
| 2,984,680 | Walsh | May 16, 1961 |
| 3,036,994 | Meyer et al. | May 29, 1962 |
| 3,053,807 | Lederman et al. | Sept. 11, 1962 |